(12) United States Patent
Li et al.

(10) Patent No.: US 9,380,576 B2
(45) Date of Patent: Jun. 28, 2016

(54) STOCHASTIC RADIO SOURCE ALLOCATION FOR SHARED RADIO ACCESS NETWORK

(71) Applicant: Telefonaktiebolaget L M Ericsson (Publ), Stockholm (SE)

(72) Inventors: Weigang Li, Ontario (CA); Xiaoming Lai, Ottawa (CA); Xixian Chen, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 93 days.

(21) Appl. No.: 14/356,803

(22) PCT Filed: May 1, 2014

(86) PCT No.: PCT/IB2014/061142
§ 371 (c)(1),
(2) Date: May 7, 2014

(87) PCT Pub. No.: WO2015/166309
PCT Pub. Date: Nov. 5, 2015

(65) Prior Publication Data
US 2015/0319741 A1 Nov. 5, 2015

(51) Int. Cl.
*H04W 4/00* (2009.01)
*H04W 72/04* (2009.01)
*H04W 72/12* (2009.01)
*H04W 72/10* (2009.01)

(52) U.S. Cl.
CPC ............ *H04W 72/044* (2013.01); *H04W 72/12* (2013.01); *H04W 72/10* (2013.01)

(58) Field of Classification Search
CPC ..................... H04W 72/1263; H04W 72/1278; H04W 72/044; H04W 72/12; H04L 1/1854
USPC .......................................................... 370/329
See application file for complete search history.

(56) References Cited

U.S. PATENT DOCUMENTS

| 2009/0154415 | A1 | 6/2009 | Park et al. | |
| 2011/0223924 | A1* | 9/2011 | Lohr | H04W 72/042 455/450 |
| 2013/0201923 | A1* | 8/2013 | Ren | H04L 5/0053 370/329 |

FOREIGN PATENT DOCUMENTS

| EP | 2 151 953 A1 | 2/2010 |
| WO | 2013006110 A2 | 1/2013 |

OTHER PUBLICATIONS

NPL1_International Search Report and Written Opinion dated Jan. 14, 2015 for International Application No. PCT/IB2014/061142, International Filing Date: May 1, 2014 consisting of 12-pages.

(Continued)

*Primary Examiner* — Sai-Ming Chan
(74) *Attorney, Agent, or Firm* — Christopher & Weisberg, P.A.

(57) ABSTRACT

An apparatus for allocating radio resources shared among a plurality of network operators is provided. Each network operator has at least one scheduling entity, SE, and a respective resource allocation, RA, probability for being selected for radio resource allocation during a transmission time interval, TTI. The apparatus includes a processor and a memory. The memory contains instructions executable by the processor that are configured to cause the apparatus, within a TTI, to select a network operator of the plurality of network operators for resource allocation within the TTI based at least in part on the RA probability of the network operator, allocate radio resources to an SE of the selected network operator within the TTI and update the RA probability of selecting each of the plurality of network operators for a next selection of resource allocation.

35 Claims, 7 Drawing Sheets

(56) References Cited

OTHER PUBLICATIONS

NPL2-Aydin et al.—"A Two-Step Scheduler for Dynamically Sharing Wireless Channel Resources Among Operators", Published in Vehicular Technology Conference (VTC Spring), 2013 IEEE 77th Conference, Jun. 2-5, 2013, Dresden, Germany, pp. 1-6 ISSN: 1550-2252, DOI: 10.1109/VTCSpring.2013.6691851, INSPEC Accession No. 14023578, Publisher: IEEE consisting of 6-pages.

* cited by examiner

STOCHASTIC RADIO SOURCE ALLOCATION FOR SHARED RADIO ACCESS NETWORK

FIELD

The present invention relates to a method, apparatus and node for communication systems, and in particular to allocation of shared radio resources of multiple network operators.

BACKGROUND

The use of mobile devices in Long Term Evolution (LTE) based networks has continued to grow at a rapid pace. In turn, the volume of data traffic carried by network operators continues to rise. This combined with the demand for greater data rates has led to a need for increased radio resources. However, the radio spectrum is a finite resource and the cost associated with building, expanding and operating cellular networks is high such that efficient allocation of existing radio resources is playing a bigger part in scheduling of radio resources. Thus, network operators must pursue ways to exploit wireless networks by efficiently sharing resources.

There are several existing solutions for allocating radio resources. A relatively simple way to share radio resources is to assign each network operator a fixed set of Physical Resources Blocks (PRBs) such that each network operator's traffic is scheduled only within its dedicated PRBs. For example, two network operators are allocated a fixed set of PRBs such that there is complete physical isolation between network operators, i.e., the traffic load of one network operator does not change the traffic load of the other network operator. However, this solution provides poor overall spectral efficiency because it unnecessarily limits the instantaneous peak data rate available to users of one operator when there is low traffic in the cell from other network operators for a certain period of time. In other words, PRBs dedicated to a network operator having low traffic may go unused during a transmission time interval (TTI) while another network operator may not have enough PRBs to service its users during the TTI. Therefore, the throughput of a network operator is unnecessarily limited even when the load of the other network operator is low.

Another existing solution involves reserving a minimum fixed set of PRBs for each operator, and allowing one network operator to use more resources from the shared PRBs when other network operators have low traffic. However, this existing solution does not fully utilize all the available resources and lacks flexibility in resource allocation. For example, the minimum fixed set of PRBs dedicated to a network operator having low traffic may go unused during a TTI. Further, this existing solution increases the complexity of the scheduler as the scheduler always has to service each network operator every TTI.

SUMMARY

The present invention advantageously provides a method, apparatus and node for allocation of radio resources shared among multiple network operators.

According to one embodiment of the invention, an apparatus for allocating radio resources shared among a plurality of network operators is provided. Each network operator has at least one scheduling entity, SE, and a respective resource allocation, RA, probability for being selected for radio resource allocation during a transmission time interval, TTI. The apparatus includes a processor and a memory. The memory contains instructions executable by the processor that are configured to cause the apparatus, within a TTI, to select a network operator of the plurality of network operators for resource allocation within the TTI based at least in part on the RA probability of the network operator, allocate radio resources to an SE of the selected network operator within the TTI and update the RA probability of selecting each of the plurality of network operators for a next selection of resource allocation.

According another embodiment of this aspect, wherein the SE of the selected network operator within the TTI is an SE having a highest priority from a priority queue of the selected network operator.

According to another embodiment of this aspect, the memory further contains instructions executable by the processor that are configured to cause the apparatus, within a TTI, to determine remaining available resources for the TTI after the allocation of radio resources to the at least one SE of the selected network operator and if available radio resources for the TTI remain, determine whether at least one priority queue of the remaining plurality of network operators is not empty. The memory further contains instructions executable by the processor that are configured to cause the apparatus, within a TTI, to clear the RA probability of the selected network operator, update RA probability of selecting the remaining plurality of network operators having respective non-cleared RA probability and select a network operator of the remaining plurality of network operators having respective non-cleared RA probability for resource allocation based at least in part on the updated RA probability.

According to another embodiment of this aspect, the memory further contains instructions executable by the processor that are configured to cause the apparatus, within a TTI, to remove the SE of the selected network operator from the priority queue of the selected network operator and after removing the SE of the selected network operator from the priority queue, determine whether the priority queue of the selected network operator is empty. The memory further contains instructions executable by the processor that are configured to cause the apparatus, within a TTI, to if the priority queue of the selected network operator is not empty, allocating available resources to another SE of the selected network operator.

According to another embodiment of this aspect, the SE of the selected network operator is allocated all the available radio resources shared among a plurality of network operators for the TTI. The memory further contains instructions executable by the processor that are configured to update the RA probability for selecting the plurality of network operators during the next TTI based at least in part on radio sources that were allocated during the TTI.

According to another embodiment of this aspect, each network operator of the plurality of network operators is associated with a corresponding plurality of priority queues, each priority queue having a different priority level. The radio resources allocated to the selected network operator are for priority queues having a first priority level. The memory further contains instructions executable by the processor that are configured to cause at least a portion of the remaining radio resources to be allocated to a priority queue having a first priority level of another one of the plurality of network operators. The priority queues have the first priority level of the selected network operator and the other one of the plurality of network operators being allocated resources before priority queues of a second priority level.

According to another embodiment of this aspect, the first priority level is associated with at least one of re-transmission of transport blocks and system information and the second priority level is associated with at least one of voice over internet protocol, VOIP, packets that are within a predefined amount of their respective time delay budgets and real time gaming. According to another embodiment of this aspect, the RA probability for each network operator is initially set to a predefined share of radio resources. According to another embodiment of this aspect, the memory further contains instructions executable by the processor that are configured to cause the apparatus, within a TTI, to remove the SE of the selected network operator from a priority queue of the selected network operator after the allocation of radio resources to the SE of the selected network operator and determine whether available radio resources remain for the TTI after the allocation of radio resources to the SE of the selected network operator. If available radio resources remain for the TTI, determine whether the priority queue of the selected network operator is empty. If the priority queue of the selected network operator is not empty, allocate available radio resources to another SE of the selected network operator.

According to another embodiment of this aspect, the updating of the respective RA probability of selecting each of the plurality of network operators for a next selection of resource allocation includes decreasing the RA probably of re-selecting the network operator for resource allocation, increasing the RA probability of selecting the remaining plurality of network operators during the TTI, selecting one of the remaining plurality of network operators for resource allocation based at least in part on the updated RA probability and allocating radio resources to the selected one of the remaining plurality of network operators during the TTI.

According to another embodiment of this aspect, the memory further contains instructions executable by the processor that are configured to update the RA probability of each of the plurality of network operators for radio resource allocation during a subsequent TTI based at least in part on radio resources that were allocated to at least one of the plurality of network operators during the TTI. According to another embodiment of this aspect, the memory further contains instructions executable by the processor that are configured to update the RA probability of each of the plurality of network operators for radio resource allocation during a subsequent TTI based at least in part on radio resources that were allocated to: at least one of the plurality of network operators during the TTI and at least one of the plurality of network operators during at least one previous TTI.

According to another embodiment of this aspect, the memory further contains instructions executable by the processor that are configured to determine the updated RA probability of selecting one of the plurality of network operators for radio resource allocation during the subsequent TTI is below a predefined minimum value for the selected one of the plurality of network operators and adjust the updated RA probability of selecting the one of the plurality of network operators for radio resource allocation during the subsequent TTI to be one of equal to and greater than the predefined minimum value for the one of the plurality of network operators.

According to another embodiment of the invention, a method for allocating radio resources shared among a plurality of network operators, each network operators having at least one scheduling entity, SE, and a respective resource allocation, RA, probability for being selected for radio resource allocation during a transmission time interval, TTI. A network operator of the plurality of network operators is selected for resource allocation within the TTI based at least in part on the RA probability of the network operator. Radio resources are allocated to an SE of the selected network operator within the TTI. The RA probability of selecting each of the plurality of network operators is updated for a next selection of resource allocation.

According to another embodiment of this aspect, the SE of the selected network operator within the TTI is an SE having a highest priority from a priority queue of the selected network operator. According to another embodiment of this aspect, remaining available resources are determined for the TTI after the allocation of radio resources to the at least one SE of the selected network operator. If available radio resources for the TTI remain, a determination is made whether at least one priority queue of the remaining plurality of network operators is not empty. The RA probability of the selected network operator is cleared. RA probability of selecting the remaining plurality of network operators having respective non-cleared RA probability is updated. A network operator of the remaining plurality of network operators having respective non-cleared RA probability is selected for resource allocation based at least in part on the updated RA probability.

According to another embodiment of this aspect, the SE of the selected network operator is removed from the priority queue of the selected network operator. After removing the SE of the selected network operator from the priority queue, a determination is made whether the priority queue of the selected network operator is empty. If the priority queue of the selected network operator is not empty, available resources are allocated to another SE of the selected network operator. According to another embodiment of this aspect, the SE of the selected network operator is allocated all the available radio resources shared among a plurality of network operators for the TTI. The RA probability for selecting the plurality of network operators during the next TTI is updated based at least in part on radio sources that were allocated during the TTI.

According to another aspect of this embodiment, each network operator of the plurality of network operators is associated with a corresponding plurality of priority queues. Each priority queue has a different priority level. The radio resources allocated to the selected network operator are for priority queues having a first priority level. At least a portion of the remaining radio resources are caused to be allocated to a priority queue having a first priority level of another one of the plurality of network operators. The priority queues have the first priority level of the selected network operator and the other one of the plurality of network operators being allocated resources before priority queues of a second priority level. According to another embodiment of this aspect, the first priority level is associated with at least one of re-transmission of transport blocks and system information. The second priority level is associated with at least one of voice over internet protocol, VOIP, packets that are within a predefined amount of their respective time delay budgets and real time gaming.

According to another embodiment of this aspect, the RA probability for each network operator is initially set to a predefined share of radio resources. According to another embodiment of this aspect, the SE of the selected network operator is removed from a priority queue of the selected network operator after the allocation of radio resources to the SE of the selected network operator. A determination is made whether available radio resources remain for the TTI after the allocation of radio resources to the SEs of the selected network operator. If available radio resources remain for the TTI, a determination is made whether the priority queue of the selected network operator is empty. If the priority queue of the selected network operator is not empty, available radio resources are allocated to another SE of the selected network operator.

According to another embodiment of this aspect, the updating of the respective RA probability of selecting each of the plurality of network operators for a next selection of resource allocation includes decreasing the RA probably of re-selecting the network operator for resource allocation, increasing the RA probability of selecting the remaining plurality of network operators during the TTI, selecting one of the remaining plurality of network operators for resource allocation based at least in part on the updated RA probability and allocating radio resources to the selected one of the remaining plurality of network operators during the TTI.

According to another embodiment of this aspect, the RA probability of each of the plurality of network operators is updated for radio resource allocation during a subsequent TTI based at least in part on a respective amount of radio resources that were allocated to at least one of the plurality of network operators during the TTI. According to another embodiment of this aspect, the RA probability of each of the plurality of network operators for radio resource allocation is updated during a subsequent TTI based at least in part on radio resources that were allocated to: at least one of the plurality of network operators during the TTI and at least one of the plurality of network operators during at least one previous TTI.

According to another embodiment of this aspect, the updated RA probability of selecting one of the plurality of network operators for radio resource allocation during the subsequent TTI is determined to be below a predefined minimum value for the selected one of the plurality of network operators. The updated RA probability of selecting the one of the plurality of network operators for radio resource allocation during the subsequent TTI is adjusted to be one of equal to and greater than the predefined minimum value for the one of the plurality of network operators.

According to another embodiment of the invention, a node for allocating radio resources shared among a plurality of network operators. Each network operator has at least one scheduling entity, SE, and a respective resource allocation, RA, probability for being selected for radio resource allocation during a transmission time interval, TTI. The node includes a shared resources module configured to select a network operator of the plurality of network operators for resource allocation within the TTI based at least in part on the RA probability of the network operator, allocate radio resources to an SE of the selected network operator within the TTI and update the RA probability of selecting each of the plurality of network operators for a next selection of resource allocation.

According to another embodiment of this aspect, the shared resources module is further configured to determine remaining available resources for the TTI after the allocation of radio resources to the at least one SE of the selected network operator and if available radio resources for the TTI remain, determine whether at least one priority queue of the remaining plurality of network operators is not empty. The shared resources module is further configured to clear the RA probability of the selected network operator, update RA probability of selecting the remaining plurality of network operators having respective non-cleared RA probability and select a network operator of the remaining plurality of network operators having respective non-cleared RA probability for resource allocation based at least in part on the updated RA probability.

According to one embodiment of this aspect, the SE of the selected network operator is allocated all the available radio resources shared among a plurality of network operators for the TTI. The shared resources module is further configured to update the RA probability for selecting the plurality of network operators during the next TTI based at least in part on radio sources that were allocated during the TTI. According to another embodiment of this aspect, each network operator of the plurality of network operators is associated with a corresponding plurality of priority queues. Each priority queue having a different priority level. The radio resources allocated to the selected network operator are for priority queues having a first priority level. The shared resources module are further configured to cause at least a portion of the remaining radio resources to be allocated to a priority queue having a first priority level of another one of the plurality of network operators. The priority queues have the first priority level of the selected network operator and the other one of the plurality of network operators being allocated resources before priority queues of a second priority level.

According to another embodiment of this aspect, the updating of the respective RA probability of selecting each of the plurality of network operators for a next selection of resource allocation includes decreasing the RA probably of re-selecting the network operator for resource allocation, increasing the RA probability of selecting the remaining plurality of network operators during the TTI, selecting one of the remaining plurality of network operators for resource allocation based at least in part on the updated RA probability and allocating radio resources to the selected one of the remaining plurality of network operators during the TTI.

According to another embodiment of this aspect, the shared resources module is further configured to update the RA probability of each of the plurality of network operators for radio resource allocation during a subsequent TTI based at least in part on a respective amount of radio resources that were allocated to at least one of the plurality of network operators during the TTI. According to another embodiment of this aspect, the shared resources module is further configured to update the RA probability of each of the plurality of network operators for radio resource allocation during a subsequent TTI based at least in part on radio resources that were allocated to: at least one of the plurality of network operators during the TTI and at least one of the plurality of network operators during at least one previous TTI.

According to another embodiment of this aspect, the shared resources module is further configured to determine the updated RA probability of selecting one of the plurality of network operators for radio resource allocation during the subsequent TTI is below a predefined minimum value for the selected one of the plurality of network operators and adjust the updated RA probability of selecting the one of the plurality of network operators for radio resource allocation during the subsequent TTI to be one of equal to and greater than the predefined minimum value for the one of the plurality of network operators. According to another embodiment of this aspect, the shared resources module is further configured, within a TTI, to remove the SE of the selected network operator from a priority queue of the selected network operator after the allocation of radio resources to the SE of the selected network operator and determine whether available radio resources remain for the TTI after the allocation of radio resources to the SEs of the selected network operator. The shared resources module is further configured to if available radio resources remain for the TTI, determine whether the priority queue of the selected network operator is empty, and if the priority queue of the selected network operator is not empty, allocate available radio resources to another SE of the selected network operator.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

The present invention advantageously provides an apparatus, node and method for sharing radio resources among multiple network operators. In general, network sharing refers to any arrangement by which multiple network operators share the capacity of a physical network by pooling their network infrastructure and/or leased capacity. Radio Access Network (RAN) sharing refers to the sharing of radio access network assets, which includes transport infrastructure, radio spectrum, and baseband processing resources such that one network operator can access all of the radio resources of multiple network operators, as described herein. While the invention will be discussed with respect to resource sharing of Physical Downlink Control Channel (PDCCH), Physical Downlink Service Channel (PDSCH), Physical Uplink Control Channel (PUCCH) and Physical Uplink Shared Channel (PUSCH), the invention is not limited to sharing of these resources and may include other radio resources.

While each network operator may get its own share of radio resources, multiple network operators may access the combined radio resources of the multiple network operators as discussed herein. For a TTI, a scheduling entity (SE) of a network operator to be allocated, i.e., scheduled, radio resources may, in one example, use all of the combined radio resources if needed. The radio resource usage is optimized regardless of its traffic patterns such that the stochastic method can deal with bursty traffic of a network operator without starving the other network operators of radio resources, as discussed herein.

Further, the amounts of radio resources assigned to the SE(s) of each network operator are tracked and the allocation parameters for resource allocation are also updated accordingly to reflect the recent radio resources usage of each operator. For example, the radio resource usage of each operator may be tracked in real-time and used to adjust the resource allocation algorithm for future transmission time intervals (TTIs) as discussed with reference to FIG. 6. In one embodiment, a TTI is a 1 ms scheduling interval as defined by third generation partnership project (3GPP) as is well known in the art. If a network operator has less communications traffic in the past, i.e., in prior TTIs, the network operator's users may have a greater chance of being allocated radio resources for subsequent TTIs. Further, this reduces the scheduler's complexity by avoiding multiple loops when allocating resources as not all network operators may be checked for resource allocation during a given TTI.

Figure 1:
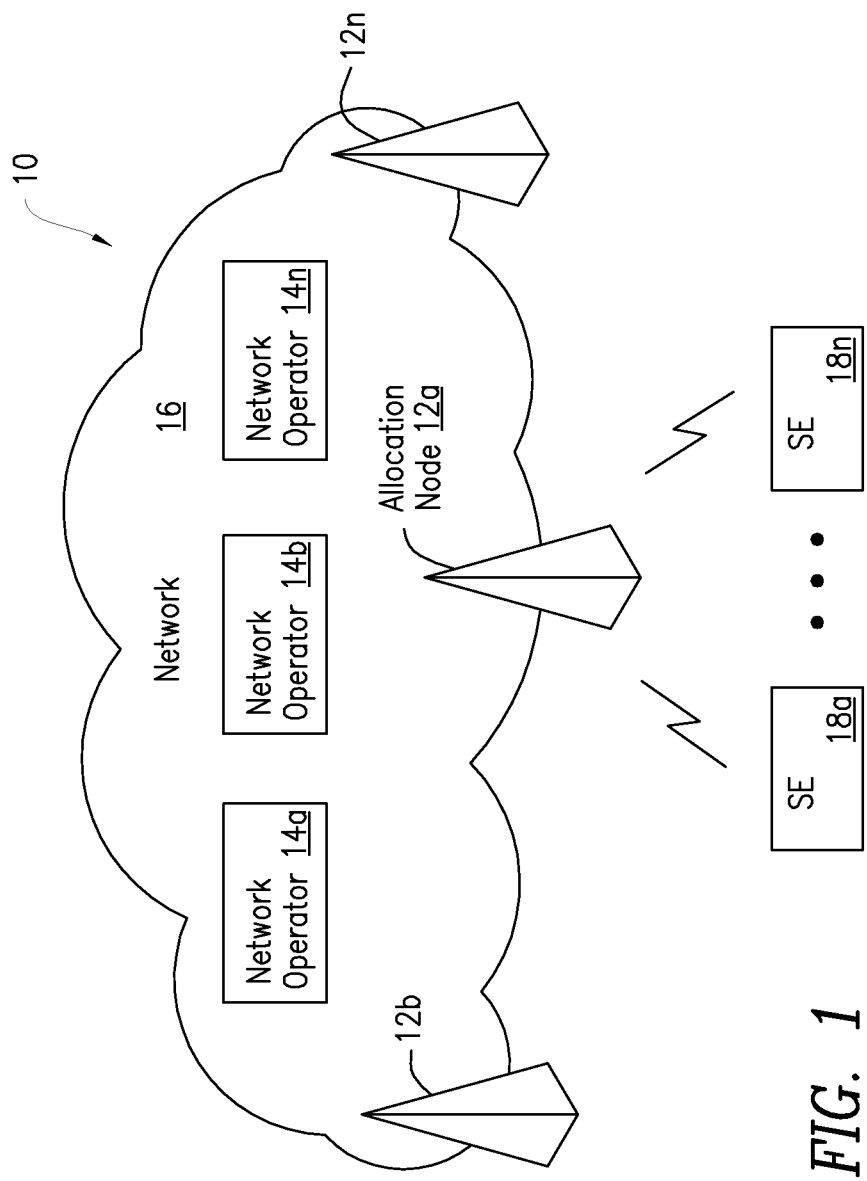
FIG. 1 illustrates a block diagram of an exemplary communication system with shared radio resource allocation in accordance with the principles of the present invention.

Accordingly, the apparatus, system, node and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Referring now to drawings figures in which like reference designators refer to like elements there is shown in FIG. 1 an exemplary system for sharing radio resources in accordance with the principles of the present invention and designated generally as "10." System 10 may include one or more allocation nodes 12a-12n (referred to collectively as "node 12") in communication one or more respective network operators 14a-14n (referred to collectively as network operator 14) via network 16. Although not shown for ease of understanding, it is understood that each individual network operator 14 has its own backhaul network which is used by the individual network operator 14 to access network 16.

Allocation node 12 may be a standalone scheduling device, or may be part of a base station or evolved Node B (eNodeB), and may be associated with one or more network operators 14. Allocation node 12 is configured to perform the functionality described herein. Network operator 14 refers to entities that own or lease radio access network assets in which each network operator 14 may be associated with a respective Packet Data Network Gateway (PGW), Mobility Management Entity (MME), Serving Gateway (SGW), among other components. Allocation node 12 is in communication with one or more scheduling entities (SEs) 18a-18n in which each SE 18 is serviced by a respective network operator 14. SE 18 may be an entity to be scheduled radio resources such as a user equipment, mobile device, among other devices capable of receiving and/or transmitted data from/to allocation node 12. SE 18 may communicate with allocation node 12 via one or more communication networks as is known in the art. Alternatively, SE 18 may be an eNodeB's logical representation of a device or UE to be scheduled resources. In another embodiment, SE 18 may be system information to be scheduled for all of the UEs.

Figure 2:
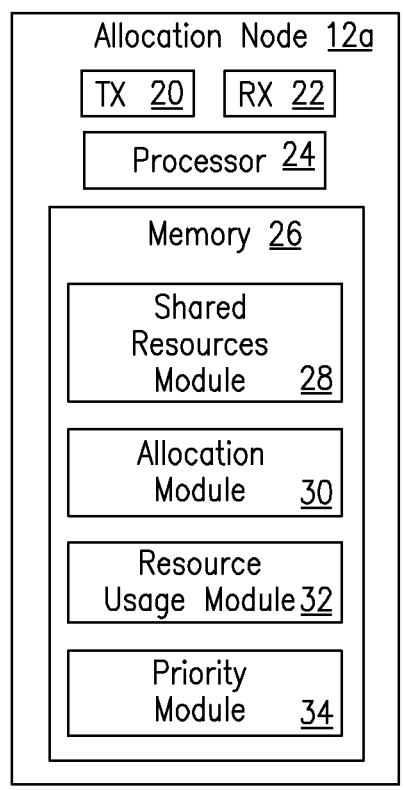
FIG. 2 is a block diagram of an allocation node for performing the shared radio resource allocation process in accordance with the principles of the present invention.

A block diagram of an exemplary allocation Node 12 is discussed with reference to FIG. 2. Node 12 may include one or more transmitters 20 and one or more receivers 22 for communicating with SE 16, network operators 14 and/or other nodes 12, among other servers, devices and nodes. Alternatively, transmitter 20 and receiver 22 may be replaced by one or more transceivers and/or communication interfaces. Node 12 may include one or more processors 24. Processor 24 includes one or more central processing units (CPUs) for performing node functions described herein. Node 12 may include memory 26 that stores shared resources module 28, allocation module 30, resource usage module 32 and priority module 34, among other data and/or modules. Memory 26 may include non-volatile and volatile memory. For example, non-volatile memory may include a hard drive, flash memory, memory stick and the like. Also, volatile memory may include random access memory and others known in the art.

Memory 26 may store program instructions such as those for shared resources module 28 that allocates shared radio resources among one or more SEs 18 of respective network operators 14. For example, shared resources module 28 includes instructions, which when executed by processor 24, cause processor 24 to perform the shared resources process, discussed in detail with respect to FIGS. 3 and 4. Memory 26 may store program instructions for allocation module 30 that performs radio resource allocation among network operators 14. For example, allocation module 30 includes instructions, which when executed by processor 24, causes processor 24 to perform the radio resource allocation process, discussed in detail with reference to FIG. 4. Memory 26 may store program instructions for resource usage module 32 that tracks radio resource usage for multiple network operators 14 that are sharing radio resources. For example, resource usage module 32 includes instructions, which when executed by processor 24, causes processor 24 to perform the resource usage process, discussed in detail with respect to FIG. 6.

Memory 26 may store program instructions for priority module 34 that provides an alternative process for radio resource allocation that is based on priority queue level(s). For example, priority module 34 includes instructions, which when executed by processor 24, causes processor 24 to perform the priority resource allocation process, discussed in detail with respect to FIG. 7. Further, memory 26 may store and update allocation parameters for one or more network operators 14 in which allocation parameters may include resource allocation (RA) probability, priority queue level and other parameters used for shared radio resource allocation as described herein. While node 12 is illustrated having multiple modules, node 12 may include one or more of modules 28, 30, 32 and 34. Further, one or more modules may be a single computer program. Further, modules 28, 30, 32 and 34 are not limited to software in memory as one or more modules can be hardware based or based on a combination of software and hardware.

Figure 3:
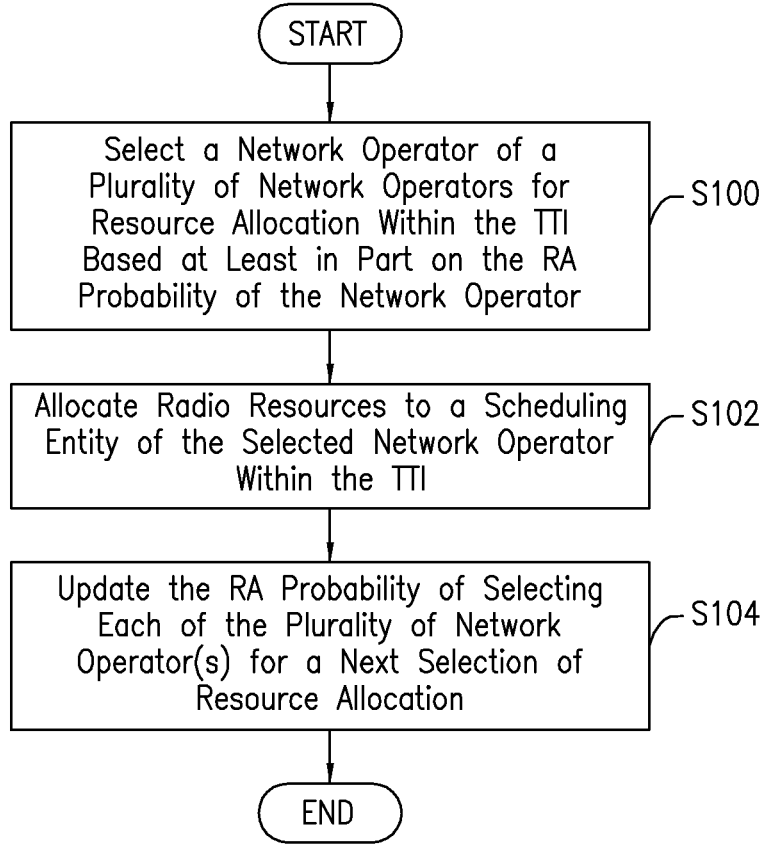
FIG. 3 is a flow chart of a shared resources allocation process in accordance with the principles of the present invention.

An exemplary flow chart of a shared resources allocation process of shared resources module 28 is described with reference to FIG. 3. Processor 24 selects a network operator 14 of a plurality of network operators 14 for resource allocation within a transmission time interval, TTI, based at least in part on a resource allocation (RA) probability of the network operators 14 (Block S100). The RA probability of each network operator 14 may initially be set to a predefined target share of radio resources that is negotiated by each network operator 14. For example, network operator 14a may have predefined target share of 40 percent (%) of the combined radio resources or whole system bandwidth, while network operators 14b and 14n each have a predefined target share of 30% of the whole system bandwidth. The target share for each network operator may vary based on design need.

Processor 24 allocates radio resources to a scheduling entity of the selected network operator 14 within the TTI (Block S102). As discussed above, a selected network operator 14 may be allocated all, none or a portion of the shared radio resources depending on the selected network operator's radio resource needs during the TTI. Processor 24 updates the RA probability of selecting each of the plurality of network operator(s) 14 for a next selection of resource allocation (Block S104). For example, after the selected network operator 14 is allocated radio resources, the selected network operator 14 may have its RA probability cleared or set to zero such that the selected network operator 14 will not be re-selected during the TTI for radio resource allocation as long as its RA probability remains cleared, as discussed in detail with respect to FIGS. 5 and 7. In another example, after the selected network operator 14 is allocated radio resources, the selected network operator 14 may have its RA probability decreased or reduced such that the selected network operator 14 will have less chance of being selected for radio resource allocation during a subsequent TTI, as discussed in detail with respect to FIGS. 4 and 6.

Figure 4:
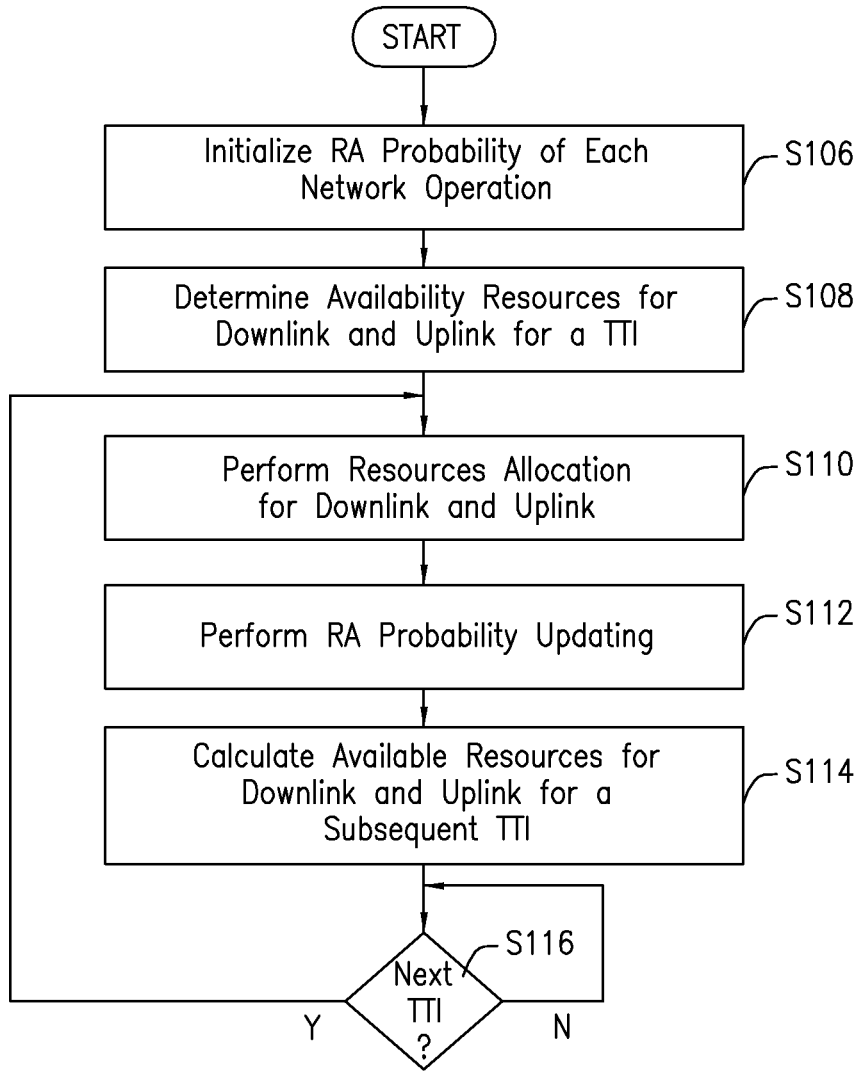
FIG. 4 is a detailed flow chart of a shared radio resource allocation process in accordance with the principles of the present invention.

An exemplary detailed flow chart of the shared resources allocation process of shared resources module 28 is described in detail with reference to FIG. 4. Processor 24 initializes the RA probability of selecting each network operator 14 (Block S106). For example, processor 24 may set the RA probability of one or more network operators 14 to their respective target share or predefined value of radio resources. Processor 24 determines available resources for downlink and uplink for a TTI (Block S108). For example, processor 24 may determine available control and/or shared channel (PDCCH, PDSCH, PUCCH and/or PUSCH) resources for a TTI. Processor 24 performs resource allocation for downlink and uplink channels (Block S110). For example, processor 24 performs resource allocation, as discussed in detail with respect to FIGS. 5 and 7. The same resource allocation method may be used for both downlink and uplink.

Figure 6:
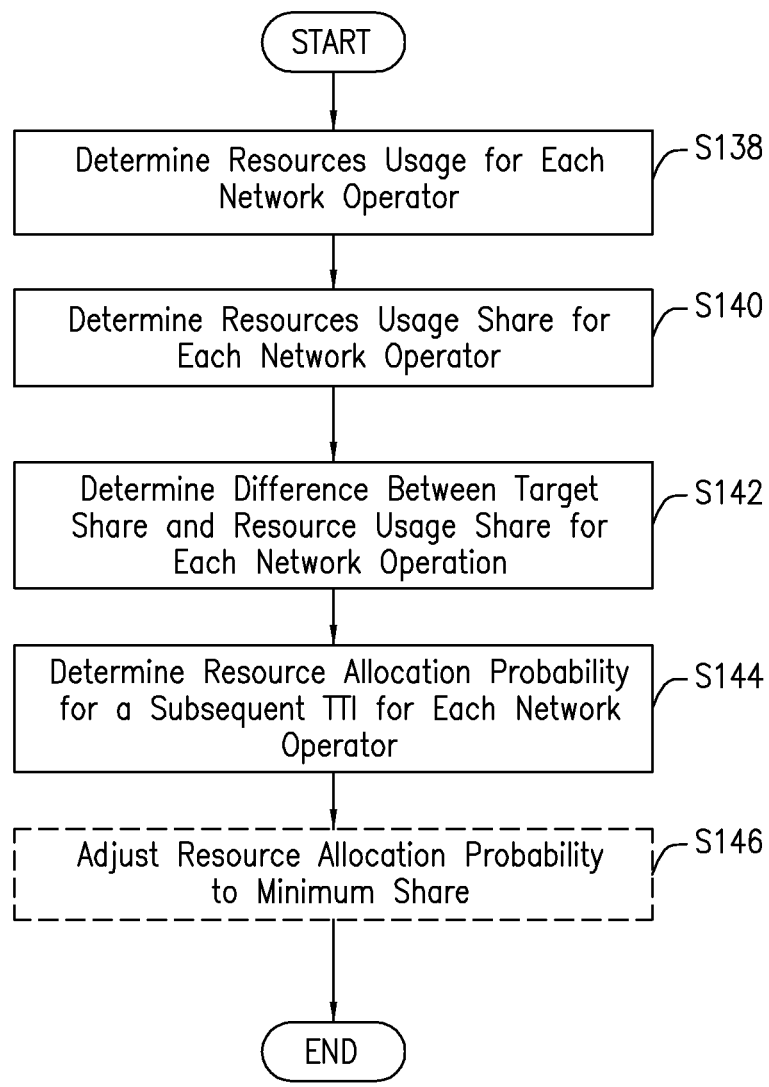
FIG. 6 is a flow chart of the resource usage process in accordance with the principles of the present invention.

Processor 24 performs RA probability update for each network operator 14, as discussed in detail with respect to FIG. 6 (Block S112). For example, the RA probability of a network operator 14 may be increased, decreased or remain the same based on radio resources usage of the network operator 14 and/or other network operators 14. Processor 24 determines available resources for downlink and uplink channels for a subsequent TTI such as a next TTI (Block S114). Processor 24 determines whether the next TTI is beginning (Blocks S116). If the next TTI is not beginning, processor 24 may periodically or continuously repeat the determination of Block S116. If processor 24 determines the next TTI is beginning, processor 24 performs the resource allocation of Block S110 such that the shared resources allocation process is performed again using the updated RA probabilities.

Figure 5:
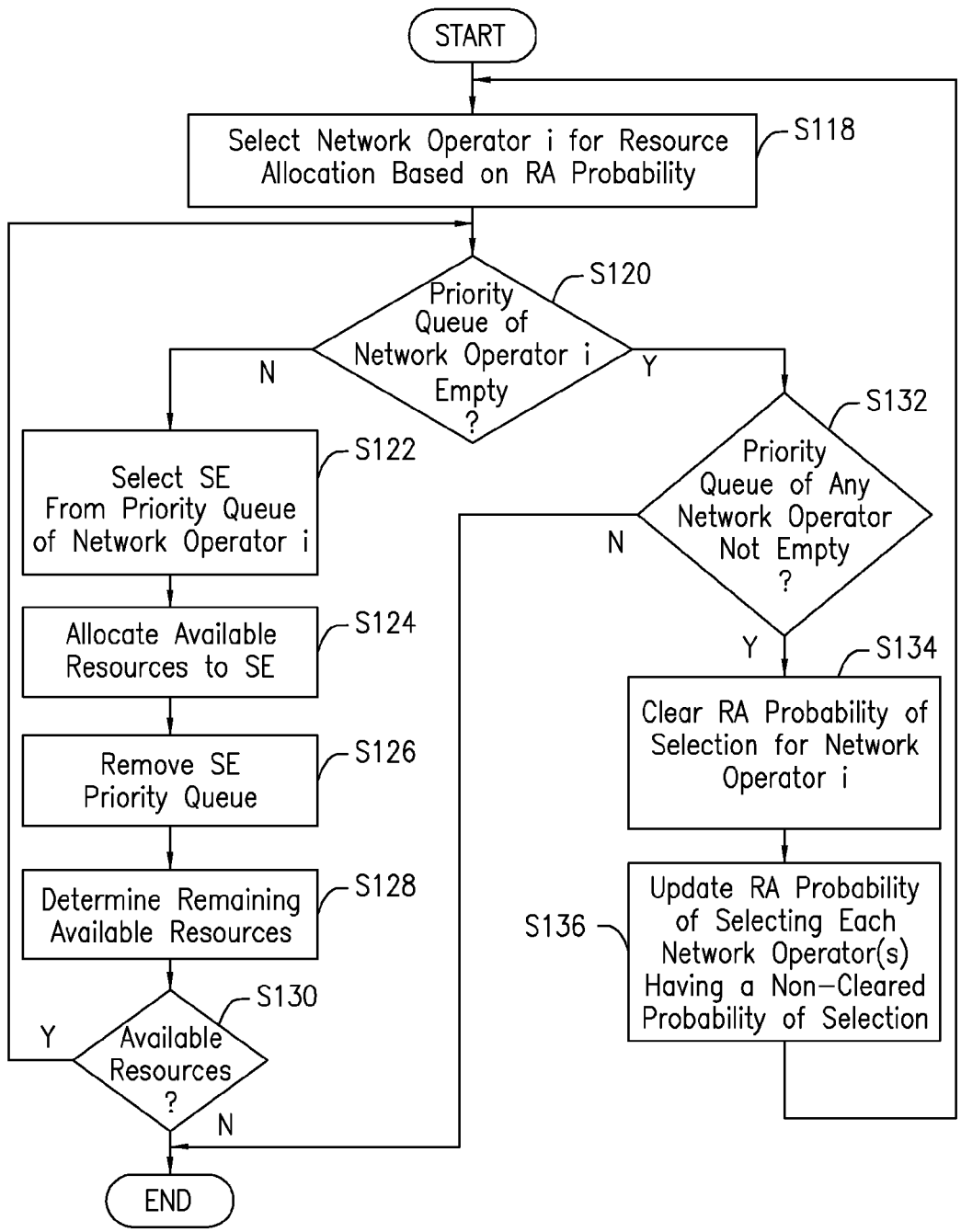
FIG. 5 is a flow chart of the resource allocation process in accordance with the principles of the present invention.

A flow chart of the resource allocation process from Block S110 in FIG. 4 performed by allocation module 30 is described in detail with reference to FIG. 5. While the process of FIG. 5 is generally described with respect to downlink radio resources, the process of FIG. 5 is equally applicable to uplink communications and downlink communications, and the process of FIG. 5 may be performed in parallel for downlink and uplink, respectively. Processor 26 selects a network operator (i) for resource allocation based on the RA probability of network operator (i) (Block S118). In one example, a random number generator, i=Rand (Prob(j), j=1, 2, 3), will generate random number 1, 2 or 3 with the probability of Prob(1), Prob(2) and Prob(3), respectively, where three network operators such as network operators 14a, 14b and 14n are sharing radio resources. In this example, network operator 14a is associated with random number 1 and Prob(1), network operator 14b is associated with random number 2 and Prob(2) and network operator 14n is associated with random number 3 and Prob(3).

Processor 24 determines whether a priority queue of selected network operator (i) is empty (Block S120). If processor 24 determines the priority queue of selected network operator (i) is not empty, processor 24 selects an SE from the priority queue of network operator (i) for resource allocation (Block S122). For example, processor 24 may select an SE with the highest priority from the priority queue of network operator (i). Processor 24 allocates shared resources to the SE of network operator (i) (Block S124). Processor 24 removes the SE, which was allocated radio resources, from the priority queue of network operator (i), i.e., processor 24 removes the SE 18 of the selected network operator from a priority queue of the selected network operator after the allocation of radio resources to the SE 18 of the selected network operator (Block S126). Processor 24 determines remaining available resources for the TTI (Block S128). For example, the SE of network operator (i) may have only needed a portion of the shared radio resources for downlink communications such that available radio resources on the downlink remain. In another example, the SE of network operator (i) may have been allocated all the shared radio resources for downlink communications such that no radio resources for downlink communications are available for the TTI.

Processor 24 determines whether there are available radio resources for the TTI, i.e., determine whether available radio resources remain for the TTI after the allocation of radio resources to the SE 18 of the selected network operator (Block S130). For example, processor 24 determines whether available radio resources for downlink communications are greater than zero. If processor 24 determines there are no available resources for the TTI, the resource allocation process of FIG. 5 may end as there are no more resources to allocate for the TTI. If processor 24 determines there are available resources for the TTI, processor 24 performs the determination of Block S120 such that another SE of selected network operator (i) can be allocated radio resources if needed, i.e., if available radio resources remain for the TTI, processor 24 determines whether the priority queue of the selected network operator 14 is empty, and if the priority queue of the selected network operator 14 is not empty, processor 24 allocates available radio resources to another SE 18 of the selected network operator 14.

Returning to Block S120, if processor 24 determines a priority queue of network operator (i) is empty, processor 24 determines whether the priority queue of any other network operator is not empty (Block S132). If processor 24 determines none of the other network operators 14, which are sharing radio resources, has a priority that is not empty, the resource allocation process of FIG. 5 may end. If processor 24 determines the priority queue of any other network operator sharing radio resources is not empty, processor 24 clears or sets to zero the RA probability of the selected network operator (i) such that the selected network operator 14 will not be reselected for downlink or uplink radio resource allocation within the TTI (Block S134). For example, network operator 14n may have its RA probability set to zero, i.e. cleared, if processor 24 determines network operator 14n has an empty priority queue and network operator 14a or 14b does not have an empty priority queue (assuming network operators 14a, 14b and 14n are sharing radio resources). This helps prevent network operator 14 with an empty priority queue, from being re-selected for resource allocation during the TTI.

Processor 24 updates the RA probability of selecting each network operator 14 having a non-cleared probability, i.e., probability not set to zero (Block S136). The RA probability of selecting at least one remaining network operators 14 having a non-cleared RA probability is increased. In one example, network operator 14a has an RA probability of 40% while both network operators 14b and 14n each have an RA probability of 30%. If the RA probability of network operator 14a is cleared, i.e., set to zero, in Block S134, then RA probabilities of both network operators 14b and 14n will be increased to 50%, i.e., the 40% probability of selecting network operator 14a is divided equally among network operators 14b and 14n. Alternatively, the 40% probability may be divided unequally such that the RA probability of network operator 14b is increased to 60% while the RA probability of network operator 14n is increased to 40%. In yet another alternative, the RA probability may not be divided such that the RA probability of only one network operator 14 is increased, e.g., the RA probability of network operator 14b is increased to 70% while the RA probability of network operator 14n remains the same at 30%. In other words, the RA probability of the cleared network operator 14 is transferred to one or more of the remaining network operators 14 that have non-cleared RA probabilities for the TTI. After the RA probabilities have been updated, processor 24 performs Block S118 such that another network operator 14 with a non-cleared RA probability is selected for resource allocation.

A flow chart of the resource usage process from Block S112 in FIG. 4, performed by usage module 32 for tracking resource usage is described in detail with reference to FIG. 6. Processor 24 determines resource usage for each network operator 14 (Block S138). In particular, the overall resource usage RE(i) for each network operator 14 may be tracked. In one example, the overall resource usage may include an accumulated number resource elements (REs) used for PDCCH, PDSCH, PUCCH and PUSCH, respectively. RE_PDCCH(i), RE_PDSCH(i), RE_PUCCH (i) and RE_PUSCH(i) represent the average number of REs used for network operators 14a, 14b and 14n, respectively, e.g., where i=1 represents network operator 14a, i=2 represents network operator 14b and i=3 represents network operator 14n in a three network operator 14 configuration. After resource allocation for each TTI, these values may be updated as follows:

$$RE\_PDCCH(i)=(1-\alpha)*RE\_PDCCH_P(i)+\alpha*RE\_PDCCH_{ASSIGNED}(i);$$

$$RE\_PDCCH_P(i)=RE\_PDCCH(i);$$

$$RE\_PDSCH(i)=(1-\alpha)*RE\_PDSCH_P(i)+\alpha*RE\_PDSCH_{ASSIGNED}(i);$$

$$RE\_PDSCH_P(i)=RE\_PDSCH(i);$$

$$RE\_PUCCH(i)=(1-\alpha)*RE\_PUCCH_P(i)+\alpha*RE\_PUCCH_{ASSIGNED}(i);$$

$$RE\_PUCCH_P(i)=RE\_PUCCH(i);$$

$$RE\_PUSCH(i)=(1-\alpha)*RE\_PUSCH_P(i)+\alpha*RE\_PUSCH_{ASSIGNED}(i);$$

$$RE\_PUSCH_P(i)=RE\_PUSCH(i).$$

Where $\alpha$ is a forgetting factor for a low pas filter in which the forgetting factor specifies how quickly past values are forgotten, i.e., gives less weight to older values. The initial values for $RE\_PDCCH_P(i)$, $RE\_PDSCH_P(i)$, $RE\_PUCCH_P(i)$ and $RE\_PUSCH_P(i)$ may be set to zeroes.

The overall resource usage for each network operator 14 may be calculated as $$RE(i)=a*RE\_PDCCH(i)=b*RE\_PDSCH(i)+c*RE\_PUCCH(i)+d*RE\_PUSCH(i), i=1,2,3.$$

Where a, b, c and d, are the weighting coefficients for PDCCH, PDSCH, PUCCH and PUSCH, respectively, such that resources usage of the shared channel and/or control channel can be distinguished by giving greater weight, i.e., greater weighting coefficient, to one or more of these resources. The specific weighting coefficients may be set based on design need and may vary depending on the types of radio resources being tracked. The actual resources usage share for each network operator 14 is determined (Block S140). For example, the resource usage share for each network operator 14 may be calculate as Share($i$)=RE($i$)/(RE(1)+RE(2)+RE(3)), $i$=1,2,3.

The difference between the each network operator's actual resource usage and its target resource usage is determined (Block S142). For example, the difference (Delta(i)) between each network operator's actual resource usage and its target resource usage may be calculated as:

Delta($i$)=Target($i$)−Share($i$).

The resource allocation probabilities for the subsequent TTI are determined (Block S144). For example, the RA probabilities for the subsequent TTI may be calculated as Prob($i$)=Target($i$)+Delta($i$).

To avoid allocating too few radio resources to scheduling entities 18 of a network operator due to a bursting traffic pattern of one or more other network operators, the RA probabilities may be adjusted if at least one network operator falls below a minimum share or probability (Block S146). For example, the RA probability for each network operator 14 can be calculated as:

Prob($i$)=max{MinShare($i$),Prob($i$)}

Where MinShare(i) is the minimum probability, e.g., 5%, 10%, etc., that network operator (i) can have for each TTI.

In one example, only network operator 14a's RA probability is less than its minimum share, e.g., Prob(1)<MinShare (1). Then, processor 24 sets:

Prob(1)=MinShare(1);

Prob(2)=(1−Prob(1))*Prob(2)/(Prob(2)+Prob(3));

Prob(3)=(1−Prob(1))*Prob(3)/(Prob(2)+Prob(3)).

In another example, network operators 14a and 14b have their respective RA probability equal to less than their respective minimum shares, e.g., Prob(i)<MinShare(i), i=1, 2. The processor 20 sets:

Prob($i$)=MinShare($i$), $i$=1,2;

Prob(3)=1−Prob(1)−Prob(2).

Where MinShare(i), i=1, 2, 3, are the minimum percentage of the resources that network operators 14a, 14b and 14n could have for the next TTI, respectively. Alternatively, Block S146 may be skipped or omitted based on design need. While, the RA probability calculating and updating for each operator has been described as being performed after resource allocation for each TTI, the RA probability calculating and updating may be performed after an SE of a network operator 14 is allocated resources. In one example, the radio resource usage of each network operator 14 is tracked in real-time. While the resource usage example addressed three network operators 14a (i=1), 14b (i=2) and 14n (i=3), the resource usage calculation is not limited to three network operators and may address a different number of network operators 14, e.g., more than three, less than three.

Figure 7:
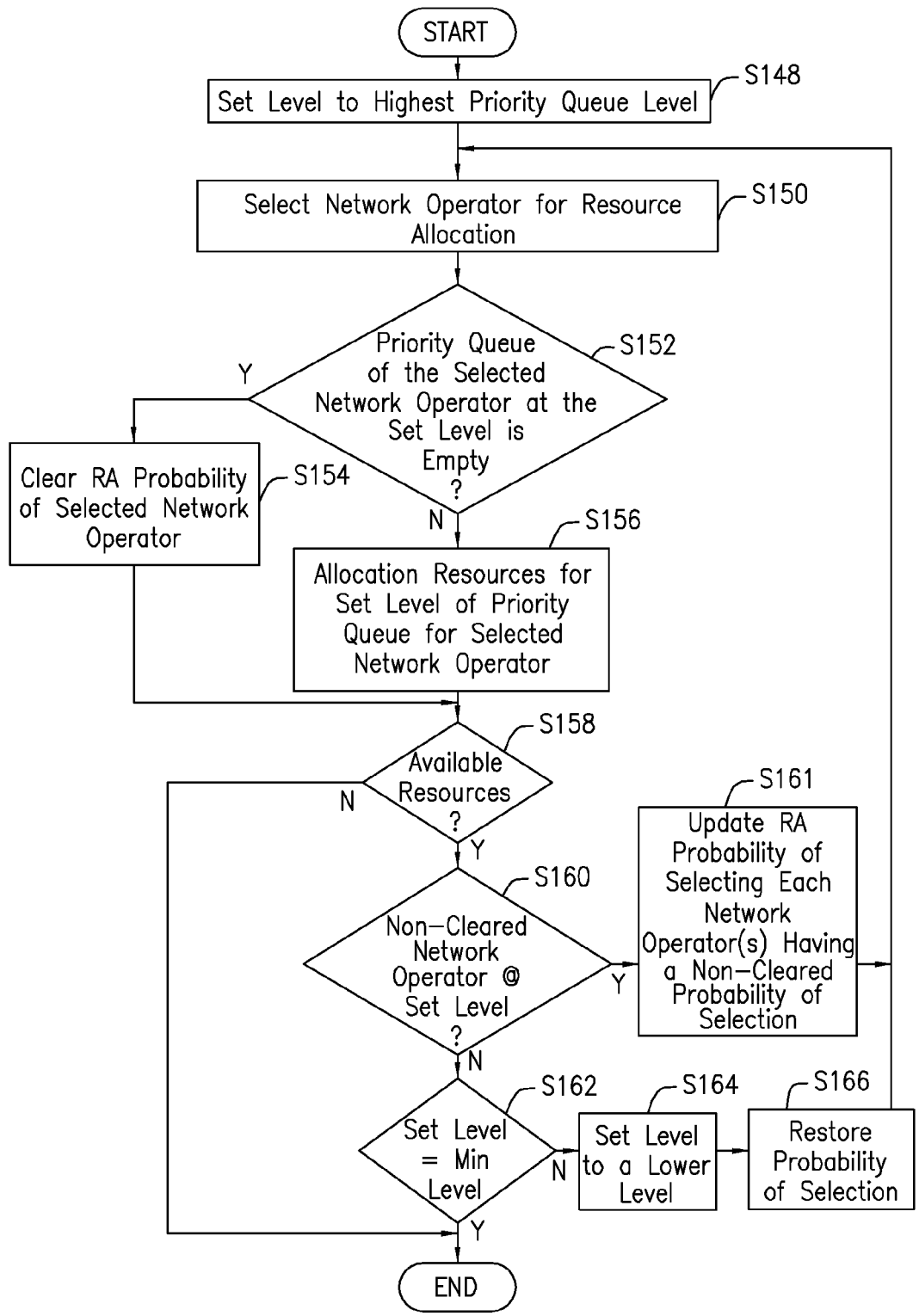
FIG. 7 is a flow chart of the priority resource allocation process in accordance with the present invention.

A flow chart of an alternative resource allocation process from Block S110 in the form of a priority resource allocation process performed by priority module 34 is described in detail with reference to FIG. 7. The priority resource allocation process advantageously provides quality of service (QoS) mechanisms such that higher priority queues of the network operators 14 are allocated resources before lower priority queues of the network operators 14. Processor 24 sets the level to be checked to the highest priority queue level (Block S148). The set level is stored in memory 26 and updated by processor 24 as described herein. For example, processor 24 may set the level to the absolute priority queue level such that the absolute priority queue level of respective network operators 14 will be serviced before lower priority queues, e.g., a high priority queue and low priority queue. Processor 24 selects network operator i for resource allocation (Block S150). For example, processor 24 may select a network operator i for resource allocation based on the RA probability associated with network operator i, similar to S100. For example, the RA probability at the beginning of the process may be set to an initialized RA probability similar to Block S106.

Processor 20 determines whether the priority queue of the selected network operator 14 at the set level is empty (Block S150). For example, processor 24 may determine whether an absolute priority queue of the selected network operator 14 is empty. If processor 24 determines the priority queue of the selected network operator 14 at the set level is empty, processor 24 clears the RA probability, i.e., sets the RA probability to zero, such that the network operator 14 will not be reselected during the TTI for resource allocation of the priority queue at the set level that was already checked.

Referring back to Block S156, if processor 24 determines the priority queue of the selected network operator 14 at the set level is not empty, processor 24 causes resources to be allocated for the priority queue of the selected network operator 14 at the set level (Block S156). For example, if the set level is at the absolute priority queue level, then the SE(s) belonging to this level queue of the selected network operator 14 will be allocated radio resources. After allocating resources for the set level of a selected network operator 14, processor 24 determines whether resources are available for the TTI (Block S158). If processor 24 determines there are no available resources for the TTI, the priority process may end, i.e., may end for the TTI.

If processor 24 determines there are available resources for the TTI, processor 24 determines whether there is at least one network operator 14 with a non-cleared RA probability, i.e., a priority queue of a network operator 14 at the set level has not been checked (Block S160). If processor 24 determines that at least one network operator 14 with a priority queue at the set level has not been cleared, processor 24 updates the RA probability of selecting each network operator having a non-cleared probability of selection as discussed above with respect to S136 (Block S161). Therefore, the remaining one or more network operators 14 at the set level that have not been checked at S152 will have their respective RA probabilities updated for the next selection of a network operator at Block S150.

After the update of RA probabilities at S160, processor 24 performs Block S150 such that the priority queue of the one of the network operators 14 at the set level having a non-cleared and updated RA probabilities can be selected for checking. Referring back to Block S160, if processor 24 determines priority queue of the network operators 14 at the set level have been cleared via Block S154, i.e., all priority queues of the network operators 14 at the set level have been checked, processor 24 determines whether the set level is at a minimum priority level (Block S162). For example, processor 24 determines whether the set level is set to the lowest priority queue level where the priority queue levels vary from an absolute priority queue level (highest) to high priority queue level to low priority queue level (lowest) in this example.

If processor 24 determines the set level is at the minimum level, the priority allocation process may end as all queues have been checked for the TTI. If processor 24 determines the set level is not at the minimum level, processor 24 set the level to a lower level (Block 164). For example, the new level may be set to one level down in priority such that the set level will be lowered from the absolute priority queue level to the high priority queue level. Processor 24 restores the RA probability of selection (Block S166). For example, the RA probability may be restored to the initialized RA probability similar to Block S106 or may be restored to the RA probability calculated from the previous TTI(s). In one embodiment, processor 24 is configured to update the RA probability of each of the plurality of network operators 14 for radio resource allocation during a subsequent TTI based at least in part on radio resources that were allocated to: at least one of the plurality of network operators 14 during the TTI and at least one of the plurality of network operators during at least one previous TTI. After the RA probability for each network operator 14 has been restored, processor 24 performs the selection of Block S150. For example, with the set level decreased, e.g., to the high priority queue level, and the RA probability of each network operator restored, processor 24 re-performs priority allocation process but for the lowered level, e.g., high priority queue level.

The priority resource allocation process advantageously allocates radio resources by priority queue level such that a lower level priority queue of network operator 14 will not be allocated resources during a TTI before all high level priority queues of the network operators have been allocated resources, as needed. Further, the resource usage of one or more priority queues for each network operator may be tracked. In one embodiment, if the resource usage of one or more priority queues exceeds a predefined threshold, e.g., in percentage of the total resources used so far, access request(s) for new set level, e.g., high priority, users may be rejected and/or access request from existing set level, e.g., high priority, users may be rejected.

The instant invention provides for flexible and efficient sharing of radio resources among different network operators. The stochastic process for dynamic radio resource allocation advantageously allows each network operator to access the whole system bandwidth of the multiple network operators. The stochastic process allows system 10 to support different traffic patterns from the multiple network operators 14 such as burst traffic patterns without starving the rest of the network operators 14 of radio resources. Further, the stochastic process tracks resource usage among network operators such that a network operator the has been giving up its radio resources due to less network traffic will have a greater chance to get radio resources at a future time when the network operators may need more radio resources than its share. Further, the stochastic process provides QoS mechanisms for allocating radio resources based on different priority queues of the multiple network operators such that QoS of users of multiple network operators can be taken into consideration during radio resource allocation.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings, which is limited only by the following claims.

What is claimed is:

1. An apparatus for allocating radio resources shared among a plurality of network operators, each network operator having at least one scheduling entity, SE, and a respective resource allocation, RA, probability for being selected for radio resource allocation during a transmission time interval, TTI, the apparatus comprising:
   a processor; and
   a memory in communication with processor, the memory containing instructions executable by the processor that are configured to cause the apparatus, within a TTI, to:
      select a network operator of the plurality of network operators for resource allocation within the TTI based at least in part on the RA probability of the network operator;
      allocate radio resources to an SE of the selected network operator within the TTI;
      update the RA probability of selecting each of the plurality of network operators for a next selection of resource allocation.

2. The apparatus of claim 1, wherein the SE of the selected network operator within the TTI is an SE having a highest priority from a priority queue of the selected network operator.

3. The apparatus of claim 1, wherein the memory further contains instructions executable by the processor that are configured to cause the apparatus, within a TTI, to:
   determine remaining available resources for the TTI after the allocation of radio resources to the at least one SE of the selected network operator;
   if available radio resources for the TTI remain, determine whether at least one priority queue of the remaining plurality of network operators is not empty;
   clear the RA probability of the selected network operator;
   update RA probability of selecting the remaining plurality of network operators having respective non-cleared RA probability; and
   select a network operator of the remaining plurality of network operators having respective non-cleared RA probability for resource allocation based at least in part on the updated RA probability.

4. The apparatus of claim 1, wherein the memory further contains instructions executable by the processor that are configured to cause the apparatus, within a TTI, to:
   remove the SE of the selected network operator from the priority queue of the selected network operator;
   after removing the SE of the selected network operator from the priority queue, determine whether the priority queue of the selected network operator is empty;
   if the priority queue of the selected network operator is not empty, allocating available resources to another SE of the selected network operator.

5. The apparatus of claim 1, wherein the SE of the selected network operator is allocated all the available radio resources shared among a plurality of network operators for the TTI; and
   the memory further contains instructions executable by the processor that are configured to:
      update the RA probability for selecting the plurality of network operators during the next TTI based at least in part on radio sources that were allocated during the TTI.

6. The apparatus of claim 1, wherein each network operator of the plurality of network operators is associated with a corresponding plurality of priority queues, each priority queue having a different priority level;
   the radio resources allocated to the selected network operator being for priority queues having a first priority level; and
   the memory further contains instructions executable by the processor that are configured to cause at least a portion of the remaining radio resources to be allocated to a priority queue having a first priority level of another one of the plurality of network operators;

the priority queues having the first priority level of the selected network operator and the other one of the plurality of network operators being allocated resources before priority queues of a second priority level.

7. The apparatus of claim 6, wherein the first priority level is associated with at least one of re-transmission of transport blocks and system information; and the second priority level is associated with at least one of voice over internet protocol, VOIP, packets that are within a predefined amount of their respective time delay budgets and real time gaming.

8. The apparatus of claim 1, wherein the RA probability for each network operator is initially set to a predefined share of radio resources.

9. The apparatus of claim 1, wherein the memory further contains instructions executable by the processor that are configured to cause the apparatus, within a TTI, to:

remove the SE of the selected network operator from a priority queue of the selected network operator after the allocation of radio resources to the SE of the selected network operator;

determine whether available radio resources remain for the TTI after the allocation of radio resources to the SE of the selected network operator;

if available radio resources remain for the TTI, determine whether the priority queue of the selected network operator is empty;

if the priority queue of the selected network operator is not empty, allocate available radio resources to another SE of the selected network operator.

10. The apparatus of claim 1, wherein the updating of the respective RA probability of selecting each of the plurality of network operators for a next selection of resource allocation includes:

decreasing the RA probably of re-selecting the network operator for resource allocation;

increasing the RA probability of selecting the remaining plurality of network operators during the TTI;

selecting one of the remaining plurality of network operators for resource allocation based at least in part on the updated RA probability; and allocating radio resources to the selected one of the remaining plurality of network operators during the TTI.

11. The apparatus of claim 1, wherein the memory further contains instructions executable by the processor that are configured to update the RA probability of each of the plurality of network operators for radio resource allocation during a subsequent TTI based at least in part on radio resources that were allocated to at least one of the plurality of network operators during the TTI.

12. The apparatus of claim 1, wherein the memory further contains instructions executable by the processor that are configured to update the RA probability of each of the plurality of network operators for radio resource allocation during a subsequent TTI based at least in part on radio resources that were allocated to: at least one of the plurality of network operators during the TTI and at least one of the plurality of network operators during at least one previous TTI.

13. The apparatus of claim 1, wherein the memory further contains instructions executable by the processor that are configured to:

determine the updated RA probability of selecting one of the plurality of network operators for radio resource allocation during the subsequent TTI is below a predefined minimum value for the selected one of the plurality of network operators; and adjust the updated RA probability of selecting the one of the plurality of network operators for radio resource allocation during the subsequent TTI to be one of equal to and greater than the predefined minimum value for the one of the plurality of network operators.

14. A method for allocating radio resources shared among a plurality of network operators, each network operator having at least one scheduling entity, SE, and a respective resource allocation, RA, probability for being selected for radio resource allocation during a transmission time interval, TTI, the method comprising:

selecting a network operator of the plurality of network operators for resource allocation within the TTI based at least in part on the RA probability of the network operator;

allocating radio resources to an SE of the selected network operator within the TTI;

updating the RA probability of selecting each of the plurality of network operators for a next selection of resource allocation.

15. The method of claim 14, wherein the SE of the selected network operator within the TTI is an SE having a highest priority from a priority queue of the selected network operator.

16. The method of claim 14, further comprising:

determining remaining available resources for the TTI after the allocation of radio resources to the at least one SE of the selected network operator;

if available radio resources for the TTI remain, determining whether at least one priority queue of the remaining plurality of network operators is not empty clearing the RA probability of the selected network operator;

updating RA probability of selecting the remaining plurality of network operators having respective non-cleared RA probability; and selecting a network operator of the remaining plurality of network operators having respective non-cleared RA probability for resource allocation based at least in part on the updated RA probability.

17. The method of claim 14, further comprising:

removing the SE of the selected network operator from the priority queue of the selected network operator;

after removing the SE of the selected network operator from the priority queue, determining whether the priority queue of the selected network operator is empty;

if the priority queue of the selected network operator is not empty, allocating available resources to another SE of the selected network operator.

18. The method of claim 14, wherein the SE of the selected network operator is allocated all the available radio resources shared among a plurality of network operators for the TTI; and the method further comprising:

updating the RA probability for the plurality of network operators during the next TTI based at least in part on radio sources that were allocated during the TTI.

19. The method of claim 14, wherein each network operator of the plurality of network operators is associated with a corresponding plurality of priority queues, each priority queue having a different priority level;

the radio resources allocated to the selected network operator being for priority queues having a first priority level;

the method further includes causing at least a portion of the remaining radio resources to be allocated to a priority queue having a first priority level of another one of the plurality of network operators; and the priority queues having the first priority level of the selected network operator and the other one of the plurality of network operators being allocated resources before priority queues of a second priority level.

20. The method of claim 19, wherein the first priority level is associated with at least one of re-transmission of transport blocks and system information; and the second priority level is associated with at least one of voice over internet protocol, VOIP, packets that are within a predefined amount of their respective time delay budgets and real time gaming.

21. The method of claim 14, wherein the RA probability for each network operator is initially set to a predefined share of radio resources.

22. The method of claim 14, further comprising:

removing the SE of the selected network operator from a priority queue of the selected network operator after the allocation of radio resources to the SE of the selected network operator;

determining whether available radio resources remain for the TTI after the allocation of radio resources to the SEs of the selected network operator;

if available radio resources remain for the TTI, determining whether the priority queue of the selected network operator is empty;

if the priority queue of the selected network operator is not empty, allocating available radio resources to another SE of the selected network operator.

23. The method of claim 14, wherein the updating of the respective RA probability of selecting each of the plurality of network operators for a next selection of resource allocation includes:

decreasing the RA probably of re-selecting the network operator for resource allocation;

increasing the RA probability of selecting the remaining plurality of network operators during the TTI;

selecting one of the remaining plurality of network operators for resource allocation based at least in part on the updated RA probability; and allocating radio resources to the selected one of the remaining plurality of network operators during the TTI.

24. The method of claim 14, further comprising updating the RA probability of each of the plurality of network operators for radio resource allocation during a subsequent TTI based at least in part on a respective amount of radio resources that were allocated to at least one of the plurality of network operators during the TTI.

25. The method of claim 14, further comprising updating the RA probability of each of the plurality of network operators for radio resource allocation during a subsequent TTI based at least in part on radio resources that were allocated to: at least one of the plurality of network operators during the TTI and at least one of the plurality of network operators during at least one previous TTI.

26. The method of claim 14, further comprising:

determining the updated RA probability of selecting one of the plurality of network operators for radio resource allocation during the subsequent TTI is below a predefined minimum value for the selected one of the plurality of network operators; and adjusting the updated RA probability of selecting the one of the plurality of network operators for radio resource allocation during the subsequent TTI to be one of equal to and greater than the predefined minimum value for the one of the plurality of network operators.

27. A node for allocating radio resources shared among a plurality of network operators, each network operator having at least one scheduling entity, SE, and a respective resource allocation, RA, probability for being selected for radio resource allocation during a transmission time interval, TTI, the node comprising:

shared resources module configured to:

select a network operator of the plurality of network operators for resource allocation within the TTI based at least in part on the RA probability of the network operator;

allocate radio resources to an SE of the selected network operator within the TTI;

update the RA probability of selecting each of the plurality of network operators for a next selection of resource allocation.

28. The node of claim 27, wherein the shared resources module is further configured to:

determine remaining available resources for the TTI after the allocation of radio resources to the at least one SE of the selected network operator;

if available radio resources for the TTI remain, determine whether at least one priority queue of the remaining plurality of network operators is not empty;

clear the RA probability of the selected network operator;

update RA probability of selecting the remaining plurality of network operators having respective non-cleared RA probability; and select a network operator of the remaining plurality of network operators having respective non-cleared RA probability for resource allocation based at least in part on the updated RA probability.

29. The node of claim 27, wherein the SE of the selected network operator is allocated all the available radio resources shared among a plurality of network operators for the TT; and the shared resources module is further configured to:

update the RA probability for selecting the plurality of network operators during the next TTI based at least in part on radio sources that were allocated during the TTI.

30. The node of claim 27, wherein each network operator of the plurality of network operators is associated with a corresponding plurality of priority queues, each priority queue having a different priority level;

the radio resources allocated to the selected network operator being for priority queues having a first priority level; and the shared resources module further configured to cause at least a portion of the remaining radio resources to be allocated to a priority queue having a first priority level of another one of the plurality of network operators;

the priority queues having the first priority level of the selected network operator and the other one of the plurality of network operators being allocated resources before priority queues of a second priority level.

31. The node of claim 27, wherein the updating of the respective RA probability of selecting each of the plurality of network operators for a next selection of resource allocation includes:

decreasing the RA probably of re-selecting the network operator for resource allocation;

increasing the RA probability of selecting the remaining plurality of network operators during the TTI;

selecting one of the remaining plurality of network operators for resource allocation based at least in part on the updated RA probability; and allocating radio resources to the selected one of the remaining plurality of network operators during the TTI.

32. The node of claim 27, wherein the shared resources module is further configured to update the RA probability of each of the plurality of network operators for radio resource allocation during a subsequent TTI based at least in part on a respective amount of radio resources that were allocated to at least one of the plurality of network operators during the TTI.

33. The node of claim 27, wherein the shared resources module is further configured to update the RA probability of each of the plurality of network operators for radio resource allocation during a subsequent TTI based at least in part on radio resources that were allocated to: at least one of the plurality of network operators during the TTI and at least one of the plurality of network operators during at least one previous TTI.

34. The node of claim 27, wherein the shared resources module is further configured to:
   determine the updated RA probability of selecting one of the plurality of network operators for radio resource allocation during the subsequent TTI is below a predefined minimum value for the selected one of the plurality of network operators; and
   adjust the updated RA probability of selecting the one of the plurality of network operators for radio resource allocation during the subsequent TTI to be one of equal to and greater than the predefined minimum value for the one of the plurality of network operators.

35. The node of claim 27, where the shared resources module is further configured, within a TTI, to:
   remove the SE of the selected network operator from a priority queue of the selected network operator after the allocation of radio resources to the SE of the selected network operator;
   determine whether available radio resources remain for the TTI after the allocation of radio resources to the SEs of the selected network operator;
   if available radio resources remain for the TTI, determine whether the priority queue of the selected network operator is empty; and
   if the priority queue of the selected network operator is not empty, allocate available radio resources to another SE of the selected network operator.

* * * * *